United States Patent
Nagata et al.

(10) Patent No.: US 9,806,834 B2
(45) Date of Patent: Oct. 31, 2017

(54) USER TERMINAL, RADIO BASE STATION, DOWNLINK CONTROL CHANNEL RECEIVING METHOD AND MOBILE COMMUNICATION SYSTEM

(75) Inventors: Satoshi Nagata, Tokyo (JP); Tetsushi Abe, Tokyo (JP); Yoshihisa Kishiyama, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 57 days.

(21) Appl. No.: 14/114,606

(22) PCT Filed: Apr. 24, 2012

(86) PCT No.: PCT/JP2012/060983
§ 371 (c)(1),
(2), (4) Date: Nov. 20, 2013

(87) PCT Pub. No.: WO2012/150687
PCT Pub. Date: Nov. 8, 2012

(65) Prior Publication Data
US 2014/0086201 A1    Mar. 27, 2014

(30) Foreign Application Priority Data
May 2, 2011   (JP) .................................. 2011-103178

(51) Int. Cl.
*H04W 4/00*   (2009.01)
*H04J 1/02*    (2006.01)
(Continued)

(52) U.S. Cl.
CPC ................ *H04J 1/02* (2013.01); *H04L 5/006* (2013.01); *H04L 5/0053* (2013.01); *H04W 72/1289* (2013.01); *H04L 25/0224* (2013.01)

(58) Field of Classification Search
CPC ........................... H04W 72/1289; H04L 5/006
See application file for complete search history.

(56) References Cited

U.S. PATENT DOCUMENTS

| | | | |
|---|---|---|---|
| 2010/0041430 A1* | 2/2010 | Ishii ...................... | H04L 5/0075 455/522 |
| 2010/0061345 A1* | 3/2010 | Wengerter .......... | H04W 72/042 370/335 |

(Continued)

FOREIGN PATENT DOCUMENTS

| | | |
|---|---|---|
| EP | 2302830 A2 | 3/2011 |
| JP | 2011-41226 A | 2/2011 |
| WO | 2011/002218 A2 | 1/2011 |

OTHER PUBLICATIONS

International Search Report for corresponding International Application No. PCT/JP2012/06983, dated Jul. 17, 2012 (1 page).

(Continued)

*Primary Examiner* — Gregory Sefcheck
*Assistant Examiner* — Jael Ulysse
(74) *Attorney, Agent, or Firm* — Osha Liang LLP

(57) ABSTRACT

The present invention is designed such that it is possible to optimize the effect of improving the efficiency of use of radio resources even when the number of user terminals to be multiplexed over the same radio resources is further increased. A user terminal performs downlink communication with a radio base station using a PDCCH resource region and a PDSCH resource region. The user terminal detects the starting position of the radio resources where the PDSCH and the PDCCH are frequency-division-multiplexed in the PDSCH resource region in the time direction, and receives the PDCCH that is frequency-division-multiplexed over the radio resources starting from the detected starting position.

5 Claims, 13 Drawing Sheets

(51) Int. Cl.
*H04W 72/12* (2009.01)
*H04L 5/00* (2006.01)
*H04L 25/02* (2006.01)

(56) References Cited

U.S. PATENT DOCUMENTS

| | | | |
|---|---|---|---|
| 2010/0118991 A1* | 5/2010 | Lee | H04L 5/0094 375/260 |
| 2010/0120442 A1* | 5/2010 | Zhuang | H04B 7/15507 455/450 |
| 2010/0195604 A1* | 8/2010 | Papasakellariou | H04L 1/1893 370/329 |
| 2010/0195614 A1* | 8/2010 | Nimbalker | H04W 72/1289 370/330 |
| 2010/0227569 A1* | 9/2010 | Bala | H04L 5/0007 455/73 |
| 2010/0331030 A1* | 12/2010 | Nory | H04L 5/0053 455/509 |
| 2011/0038353 A1* | 2/2011 | Miki | H04J 11/0026 370/335 |
| 2011/0044391 A1* | 2/2011 | Ji | H04L 5/0007 375/260 |
| 2011/0075624 A1* | 3/2011 | Papasakellariou | H04L 5/0053 370/329 |
| 2011/0103290 A1* | 5/2011 | Suzuki | H04L 5/0023 370/312 |
| 2011/0170496 A1* | 7/2011 | Fong | H04L 5/0053 370/329 |
| 2011/0194511 A1* | 8/2011 | Chen | H04W 72/121 370/329 |
| 2011/0243015 A1* | 10/2011 | Lim | H04L 1/0026 370/252 |
| 2011/0249633 A1* | 10/2011 | Hong | H04L 5/0053 370/329 |
| 2011/0255486 A1* | 10/2011 | Luo | H04W 48/12 370/329 |
| 2011/0261769 A1* | 10/2011 | Ji | H04L 5/0007 370/329 |
| 2011/0268062 A1* | 11/2011 | Ji | H04L 5/0055 370/329 |
| 2011/0269442 A1* | 11/2011 | Han | H04W 72/082 455/418 |
| 2011/0280201 A1* | 11/2011 | Luo | H04W 72/0406 370/329 |
| 2012/0033650 A1 | 2/2012 | Ahn et al. | |
| 2012/0045014 A1* | 2/2012 | Damnjanovic | H04L 5/001 375/295 |
| 2012/0106465 A1* | 5/2012 | Haghighat | H04W 72/1289 370/329 |
| 2012/0163334 A1 | 6/2012 | Miki et al. | |
| 2013/0039284 A1* | 2/2013 | Marinier | H04L 5/001 370/329 |

OTHER PUBLICATIONS

ZTE; "Starting symbols for R-PDCCH and R-PDSCH;" TSG-RAN WG1 #61, R1-102914; Montreal, Canada; May 10-14, 2010 (7 pages).
Panasonic; "DL backhaul starting timing of R-PDCCH and R-PDSCH;" 3GPP TSG RAN WG1 Meeting #61, R1-102880; Montreal Canada; May 10-14, 2010 (3 pages).
LG Electronics Inc.; "PDSCH Starting Symbol Indication for Cross-Carrier Scheduling;" TSG-RAN WG1 Meeting #61, R1-102707; Montreal, Canada; May 10-14, 2010 (3 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Japanese Office Action issued in Japanese Patent Application No. 2011-103178, dated May 21, 2013, with English translation thereof (5 pages).
Japanese Office Action issued in Japanese Patent Application No. 2011-103178, dated Jul. 30, 2013, with English translation thereof (6 pages).
Decision to Grant issued in Japanese Patent Application No. 2011-103178, dated Dec. 3, 2014, with English translation thereof (4 pages).
Extended Search Report issued in corresponding European Application No. 127799153, dated Oct. 1, 2014 (10 pages).
LG Electronics; "Consideration on DL backhaul channel design"; 3GPP TSG RAN WG1 Meeting #60bis, R1-102421; Beijing, China; Apr. 12-16, 2010 (5 pages).
Samsung; "PDCCH Extension to Support Operation with Cross-Carrier Scheduling"; 3GPP TSG RAN WG1 #60, R1-101142; San Francisco, USA; Feb. 22-26, 2010 (2 pages).
Office Action issued in corresponding European Application No. 12779915.3, dated May 6, 2016 (8 pages).
Office Action issued in the counterpart Indonesian Patent Application No. W00201305035, dated Aug. 31, 2016 (6 pages).
Office Action issued in the counterpart European Patent Application No. 12779915.3, dated Feb. 1, 2017 (8 pages).
Office Action in counterpart Chinese Patent Application No. 201280021601.X, dated Aug. 30, 2016 (16 pages).

* cited by examiner

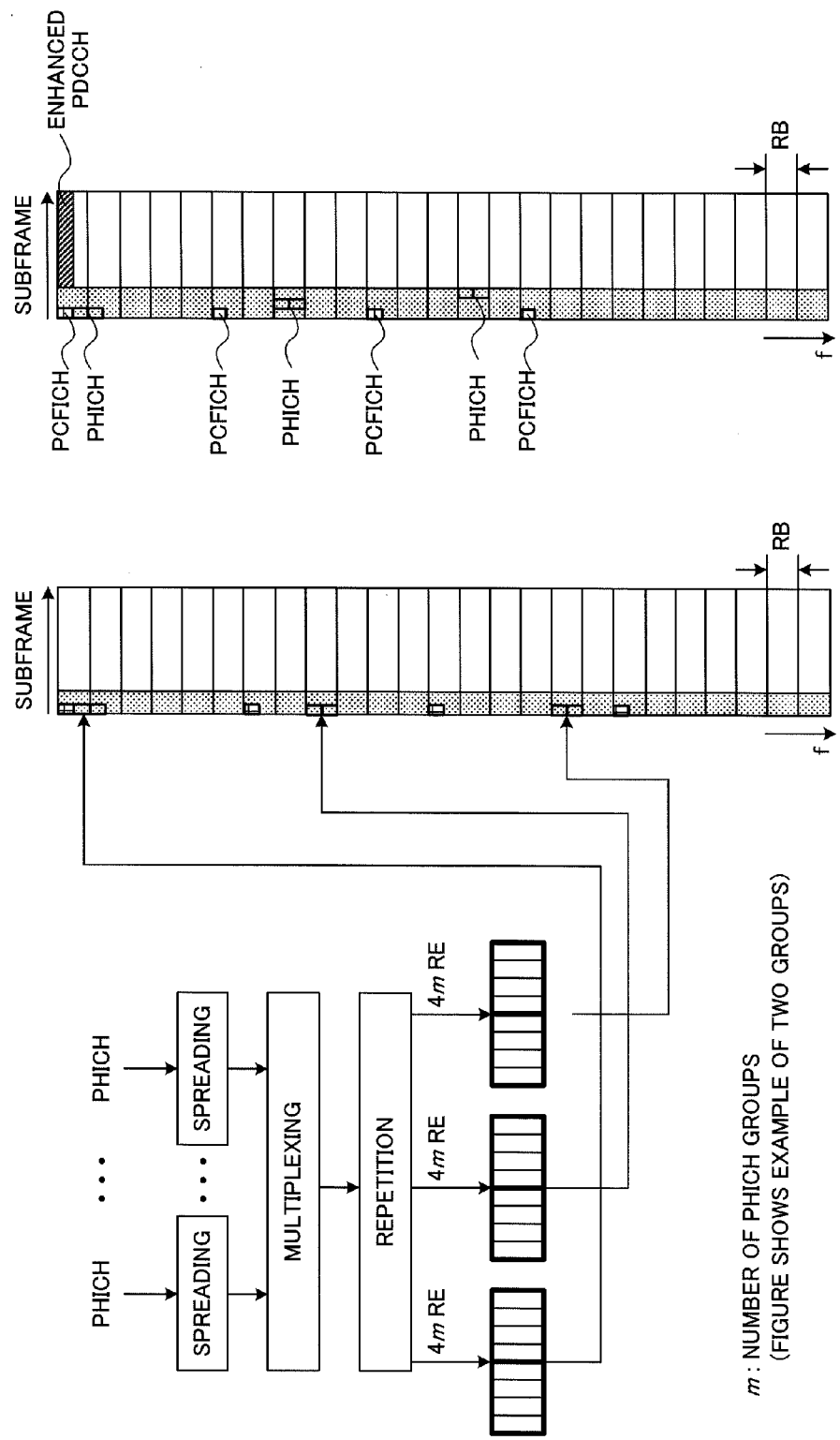

USER TERMINAL, RADIO BASE STATION, DOWNLINK CONTROL CHANNEL RECEIVING METHOD AND MOBILE COMMUNICATION SYSTEM

TECHNICAL FIELD

The present invention relates to a user terminal, a radio base station, a downlink control channel receiving method and a mobile communication system for performing downlink communication.

BACKGROUND ART

In 3GPP (3rd Generation Partnership Project), the standardization of LTE-Advanced (LTE-A) is in progress, as a fourth-generation mobile communication system to realize communication of further increased speed and increased volume from LTE (Long Term Evolution), which is an enhanced standard of the third-generation mobile communication system.

In LTE, MIMO (Multi Input Multi Output) techniques are under study as radio communication techniques to improve spectral efficiency (see, for example, non-patent literature 1). In MIMO techniques, a plurality of transmitting/receiving antennas are provided in the transmitter/receiver, so that different information sequences are space-division-multiplexed over the same frequency and the same time, and transmitted from a plurality of transmitting antennas. On the other hand, on the receiver side, taking advantage of the fact that fading variation is produced between the transmitting/receiving antennas, the information sequences that have been transmitted in the same frequency and the same time are separated and detected.

Also, in MIMO techniques, single-user MIMO (SU-MIMO) to transmit varying information sequences to a single user, and multiple-user MIMO (MU-MIMO) to transmit varying information sequences to a plurality of users, are defined. In downlink MU-MIMO transmission, varying information sequences for a plurality of user terminals are transmitted in the same frequency and the same time, from a plurality of transmitting antennas of a radio base station. In this way, in MU-MIMO transmission, it is possible to increase the number of user terminals to multiplex over the same radio resources (frequency and time), so that it is possible to improve the efficiency of use of radio resources.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, with successor systems of LTE (for example, Rel. 9 and Rel. 10), application of the above MU-MIMO transmission to a Hetnet (Heterogeneous network) and CoMP (Coordinated Multi-Point) transmission is under study. Consequently, in future systems, the number of user terminals to be multiplexed over the same radio resources is expected to further increase. However, when a conventional radio resource allocation method is used, there is a threat that the effect of improving the efficiency of use of radio resources by increasing the number of user terminals to be multiplexed over the same radio resources cannot be optimized.

The present invention has been made in view of the above, and it is therefore an object of the present invention to provide a user terminal, a radio base station, a downlink control channel receiving method and a mobile communication system, which can optimize the effect of improving the efficiency of use of radio resources even when the number of user terminals to be multiplexed over the same radio resources is further increased.

Solution to Problem

A user terminal according to the first aspect of the present invention performs downlink communication with a radio base station using a resource region for a downlink control channel and a resource region for a downlink shared channel, and this user terminal has: a detection section configured to detect a starting position of a radio resource where the downlink shared channel and the downlink control channel are frequency-division-multiplexed, in a time direction, in the resource region for the downlink shared channel; and a receiving section configured to detect the downlink control channel that is frequency-division-multiplexed in the radio resource starting from the starting position detected in the detection section.

A radio base station according to a second aspect of the present invention performs downlink communication with a user terminal using a resource region for a downlink control channel and a resource region for a downlink shared channel, and this radio base station has: a multiplexing section configured to frequency-division-multiplex the downlink shared channel and the downlink control channel over radio resources starting from a predetermined starting position in a time direction, in the resource region for the downlink shared channel; and a transmission section configured to transmit the downlink control channel and the downlink shared channel that are frequency-division-multiplexed.

A downlink control channel receiving method according to a third aspect of the present invention is a method of receiving a downlink control channel using a resource region for a downlink control channel and a resource region for a downlink shared channel, and this method includes the steps of: in a radio base station, frequency-division-multiplexing the downlink shared channel and the downlink control channel over a radio resource in the resource region for the downlink shared channel; in a user terminal, detecting a starting position of the radio resource where the downlink shared channel and the downlink control channel are frequency-division-multiplexed, in a time direction; and in the user terminal, receiving the downlink control channel that is frequency-division-multiplexed over the radio resource starting from the detected starting position.

A mobile communication system according to a fourth aspect of the present invention is a mobile communication system for performing downlink communication using a subframe having a resource region for a downlink control channel and a resource region for a downlink shared channel, and this mobile communication system includes: in a radio base station, frequency-division-multiplexing the downlink shared channel and the downlink control channel over a radio resource in the resource region for the downlink shared channel; in a user terminal, detecting a starting position of the radio resource where the downlink shared channel and the downlink control channel are frequency-division-multiplexed, in a time direction; and in the user terminal, receiving the downlink control channel that is frequency-division-multiplexed over the radio resource starting from the detected starting position.

Advantageous Effects of Invention

According to the present invention, it is possible to provide a user terminal, a radio base station, a downlink control channel receiving method and a mobile communication system which can improve the effect of improving the efficiency of use of radio resources, even when the number of user terminals to be multiplexed over the same radio resources is further increased.

BRIEF DESCRIPTION OF DRAWINGS

FIG. 6 provides diagrams to show examples of extension of a PDCCH allocation region according to a second mode of the present invention;

DESCRIPTION OF EMBODIMENTS

Figure 1:
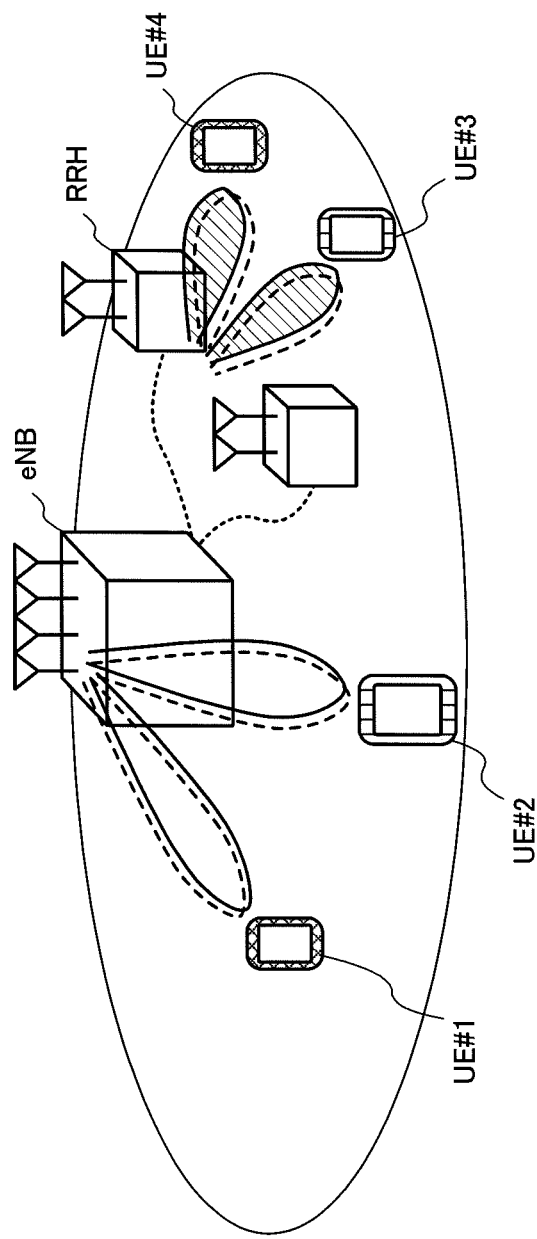
FIG. 1 is a diagram to show an example of a mobile communication system where MU-MIMO transmission is applied.

FIG. 1 is a diagram to show an example of a mobile communication system where MU-MIMO transmission is applied. The mobile communication system shown in FIG. 1 has a layered configuration in which a micro base station RRH (Remote Radio Head) to have a local coverage area is provided in the coverage area of a radio base station eNB (eNodeB). In MU-MIMO transmission in this mobile communication system, data for a plurality of user terminal UEs (User Equipment) #1 and #2 from a plurality of antennas of the radio base station eNB is transmitted in the same frequency and the same time. Also, data for a plurality of user terminal UEs #3 and #4 is transmitted in the same time and the same frequency, from a plurality of antennas of the micro base station RRH.

Figure 2:
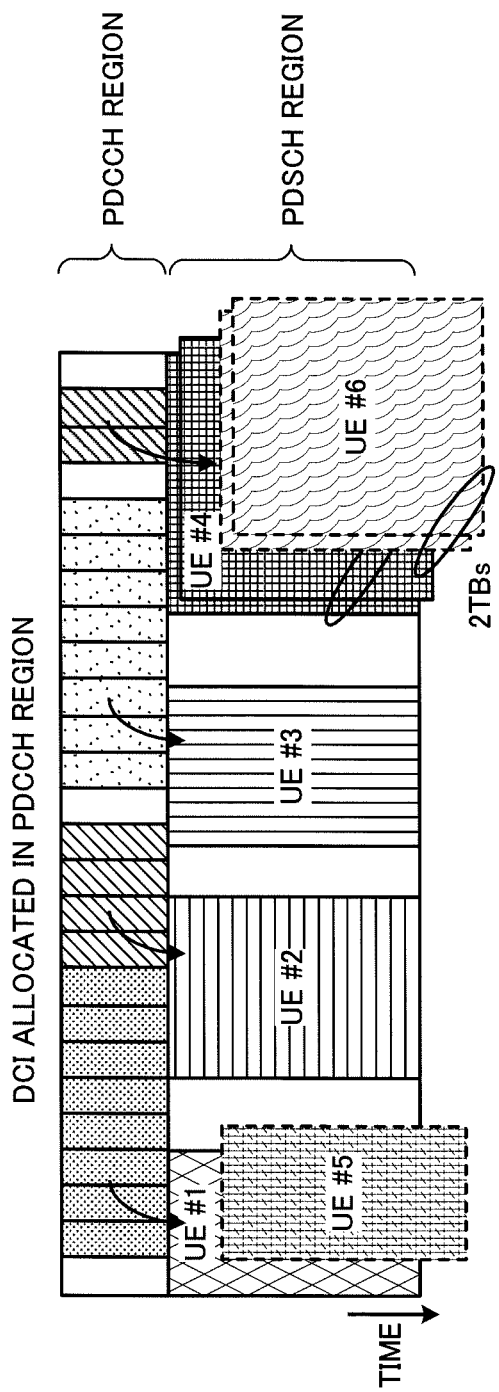
FIG. 2 is a diagram to show an example of a subframe where downlink MU-MIMO transmission is applied.

FIG. 2 is a diagram to show an example of a subframe where downlink MU-MIMO transmission is applied. As shown in FIG. 2, in a mobile communication system where MU-MIMO transmission is applied, in each subframe, a resource region for a downlink control channel (PDCCH) (hereinafter referred to as "PDCCH region") and a resource region for a downlink shared channel (PDSCH) (hereinafter referred to as "PDSCH region") are provided. In the PDCCH region, downlink control information (DCI) for user terminal UEs #1 to #4 is mapped. In the downlink control information (DCI) for user terminal UEs #1 to #4, allocation information in the PDSCH region is included.

As described above, in MU-MIMO transmission, it is possible to transmit data for a plurality of terminal UEs in the same time and the same frequency. Consequently, in the PDSCH region of FIG. 2, it may be possible to multiplex data for user terminal UE #5 in the same frequency region as for data for terminal UE #1. Likewise, it may be possible to multiplex data for user terminal UE #6 in the same frequency region as for data for user terminal UE #4.

However, in the PDCCH region of FIG. 2, there is no empty region where downlink control information (DCI) for user terminal UEs #5 and #6 can be mapped. Consequently, due to the shortage of the PDCCH region, the number of user terminal UEs to be multiplexed over the PDSCH region is limited. In this way, even when the number of user terminals to be multiplexed over the same radio resources by MU-MIMO transmission is increased, the allocation region of the PDCCH to transmit downlink control information (DCI) runs short, and, as a result of this, the effect of improving the efficiency of use of the PDSCH region may not be optimized. So, by extending the allocation region of the PDCCH region, it may be possible to optimize the effect of improving the efficiency of use of the PDSCH region by MU-MIMO transmission.

As a method of extending the PDCCH allocation region, a method of extending the PDCCH region, which has been maximum three OFDM symbols from the top of a subframe, to four OFDM symbols or more (time division approach), and a method of frequency-dividing the PDSCH region and using the result as a new PDCCH allocation region (frequency division approach) are possible. The latter frequency division approach achieves beam forming gain by performing demodulation using user-specific reference signals (DM-RSs), and therefore is considered to be particularly effective to extend the PDCCH allocation region.

However, even if, in accordance with the frequency division approach, the PDSCH region is frequency-divided and the PDCCH allocation region is extended, a user terminal UE cannot specify the radio resources (OFDM symbols) where, in the PDSCH region, the PDCCH is frequency-division-multiplexed, and therefore cannot receive that PDCCH. The present inventors have arrived at the present invention by focusing on the fact that, in this way, even if the PDSCH region is frequency-divided and the PDCCH allocation region is extended, a user terminal UE cannot receive PDCCH that is frequency-division-multiplexed over the radio resources (OFDM symbols) in the PDSCH region.

Figure 3:
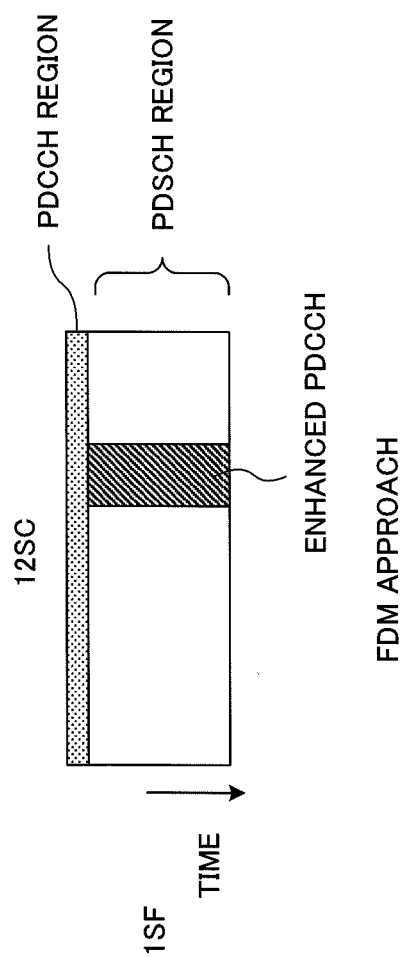
FIG. 3 is a diagram to show an example of extension of a PDCCH allocation region.

In the mobile communication system according to the present invention, as shown in FIG. 3, downlink communication is carried out using a PDCCH region and a PDSCH region. Also, the radio base station eNB frequency-division-multiplexes the PDCCH and the PDSCH in the radio resources (OFDM symbols) starting from a predetermined starting position in the PDSCH region. The user terminal UE detects the starting position of the radio resources (OFDM symbols) where the PDCCH and the PDSCH are frequency-division-multiplexed, and receives the PDCCH that is frequency-division-multiplexed in the radio resources (OFDM symbols) that start from the detected starting position. Note that the PDCCH that is frequency-division-multiplexed with the PDSCH may be referred to as "enhanced PDCCH," "FDM-type PDCCH," "UE-PDCCH" and so on.

In the mobile communication system according to the present invention, the PDSCH and the PDCCH are frequency-division-multiplexed in the above PDSCH region. Consequently, in addition to the above PDCCH region, it is also possible to allocate the PDCCH over radio resources (OFDM symbols) in the PDSCH region, so that it is possible to extend the region to allocate the PDCCH, without making changes to the existing PDCCH region. As a result of this, it is possible to prevent a decrease of throughput due to a failure to optimize the effect of improving the efficiency of use of the PDSCH region by MU-MIMO transmission due to shortage of the PDCCH allocation region.

Also, in the mobile communication system according to the present invention, the user terminal UE is able to detect the starting position of radio resources (OFDM symbols) where the PDCCH and the PDSCH are frequency-division-multiplexed in the PDSCH region. Consequently, the user terminal is able to receive the PDCCH that is frequency-division-multiplexed in the radio resources of the PDSCH region.

Now, modes in which a user terminal UE detects the starting position of radio resources (OFDM symbols) where the PDCCH and the PDSCH are frequency-division-multiplexed in the PDSCH region in the mobile communication system according to the present invention will be described.

<First Mode>

According to the first mode, a user terminal UE receives the number of OFDM symbols to constitute a PDCCH region from a radio base station eNB, and, based on the received number of OFDM symbols, detects the starting position of OFDM symbols (multiplexing symbols) where the above PDCCH and PDSCH are frequency-division-multiplexed.

Figure 4:
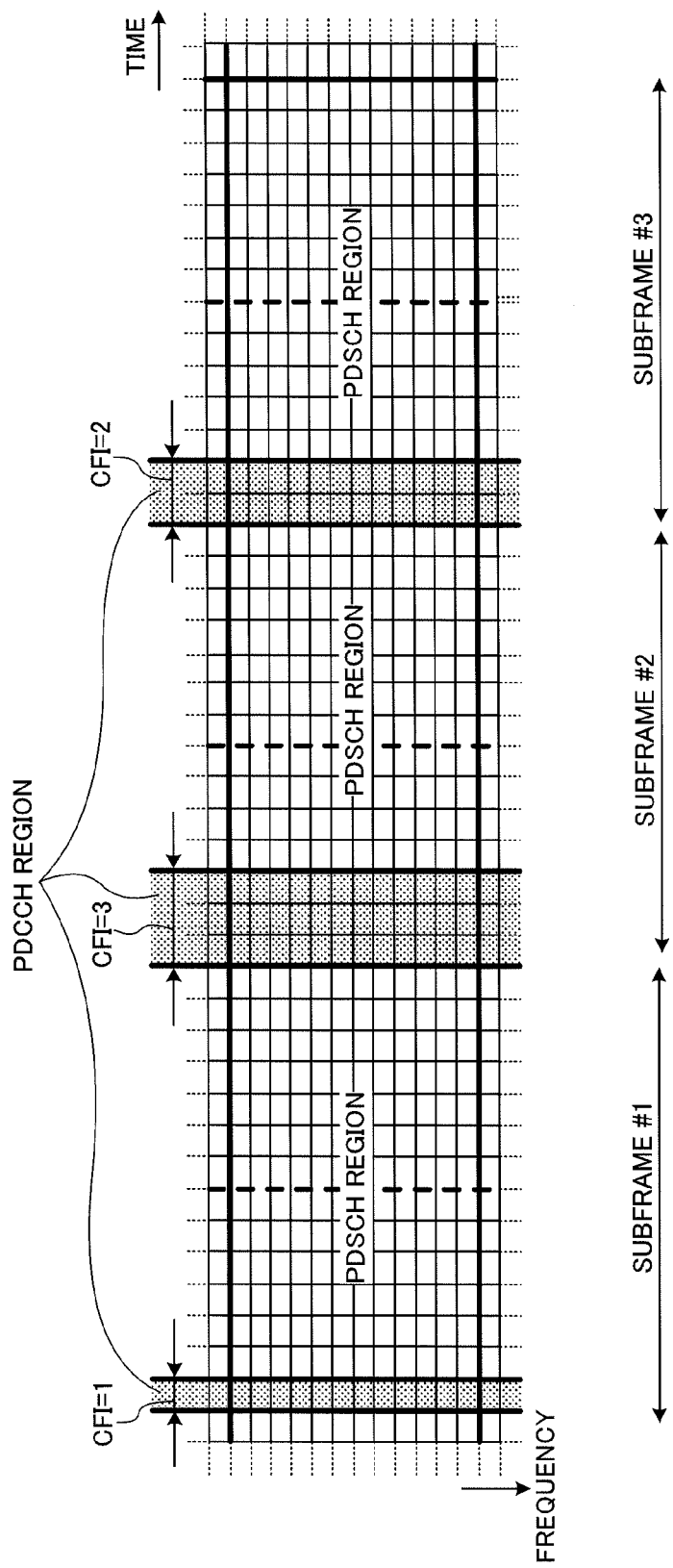
FIG. 4 is a diagram to explain PDCCH regions and PDSCH regions.

FIG. 4 is a diagram to explain PDCCH regions and PDSCH regions. As shown in FIG. 4, each subframe is formed with fourteen OFDM symbols (1 ms). The PDCCH regions are formed with maximum three OFDM symbols from the top of each subframe. On the other hand, the PDSCH regions are formed with the rest of OFDM symbols, excluding the OFDM symbols constituting the PDCCH region of each subframe.

As shown in FIG. 4, the number of OFDM symbols to constitute the PDCCH region varies per subframe. For example, in FIG. 4, the PDCCH region is formed with the top one OFDM symbol in subframe #1, formed with the top three OFDM symbols in subframe #2, and formed with the top two OFDM symbols in subframe #3. The number of OFDM symbols to constitute the PDCCH region of each subframe is specified by a CFI (Control Format Indicator). The CFI is information to represent the number of OFDM symbols to constitute the PDCCH region (for example, two-bit information to identify 1 to 3), and is transmitted by the PCFICH (Physical Control Format Indicator Channel). The PCFICH to include the CFI is allocated to the top OFDM symbol of each subframe.

Figures 5A, 5B:
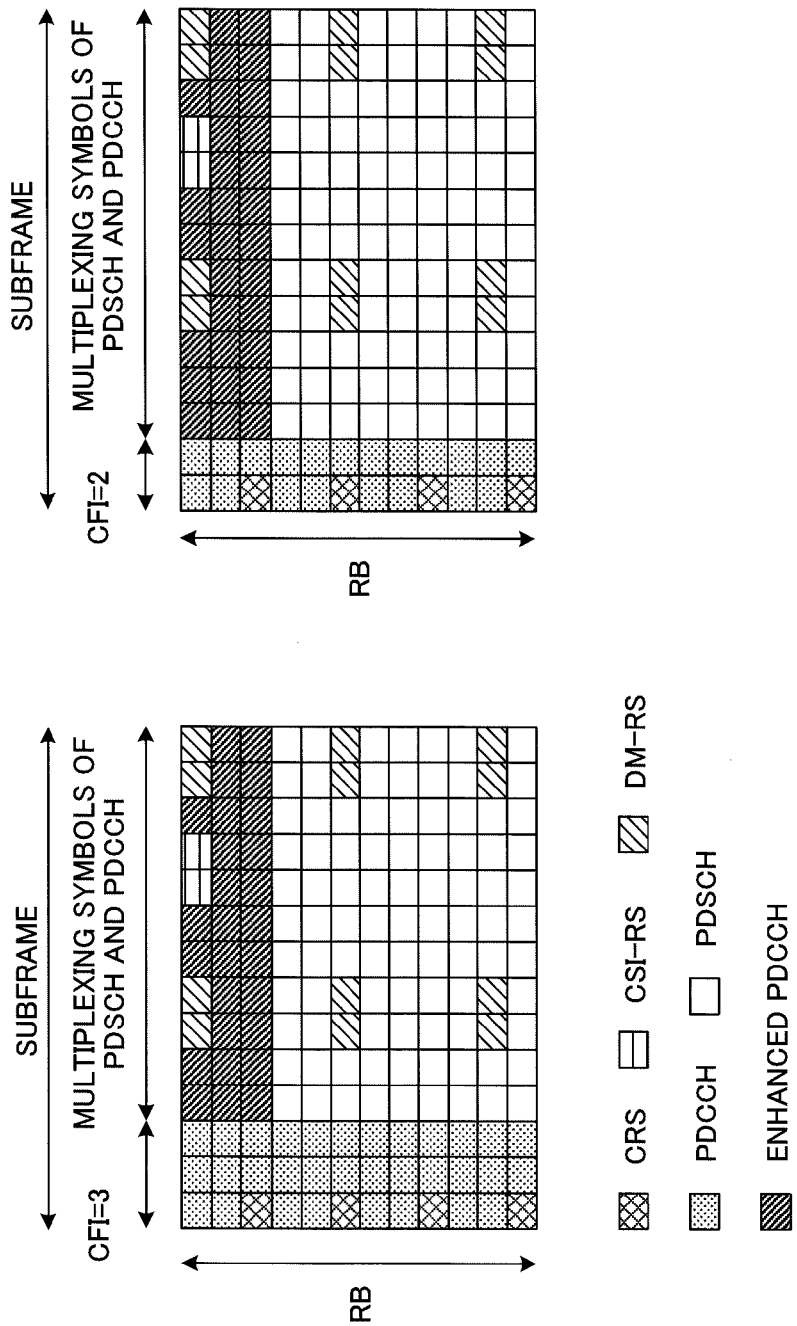
FIG. 5 provides diagrams to show examples of extension of a PDCCH allocation region according to the first mode of the present invention.

FIG. 5 provides diagrams to explain examples of extension of the PDCCH allocation region according to the first mode. FIG. 5A shows an example of extension when CFI=3, and FIG. 5B shows an example of extension when CFI=2. FIG. 5A and FIG. 5B each show one subframe including fourteen OFDM symbols in the time direction and one resource block including twelve subcarriers in the frequency direction. In the examples of extension shown in FIG. 5A and FIG. 5B, the PDCCH can also be allocated to predetermined frequency resources (subcarriers) in the PDSCH region, in addition to the PDCCH region.

In FIG. 5A, the PDCCH region is formed with the first to third OFDM symbols from the top, and the CFI value is 3. Also, the PDSCH region is formed with the fourth to fourteenth OFDM symbol from the top. In this case, the (the CFI value+1)-th OFDM symbol is the starting position, and, in the (the CFI value+1)-th and later OFDM symbols, that is, in the fourth to fourteenth OFDM symbols, the PDCCH and the PDSCH are frequency-division-multiplexed. For example, in FIG. 5A, the PDCCH is allocated not only to all subcarriers of the first to third OFDM symbols from the top, but is also allocated to part of the subcarriers (three subcarriers in FIG. 5A) of the fourth to fourteenth OFDM symbols from the top.

On the other hand, in FIG. 5B, the PDCCH region is formed with the first and second OFDM symbols from the top, and the CFI value is 2. Also, the PDSCH region is formed with the third to thirteenth OFDM symbols from the top. In this case, the (the CFI value+1)-th OFDM symbol is the starting position, and, in the (the CFI value+1)-th and later OFDM symbols, that is, in the third to thirteenth OFDM symbols, the PDCCH and the PDSCH are frequency-division-multiplexed. For example, in FIG. 5B, the PDCCH is allocated not only to all subcarriers of the first and second OFDM symbols from the top, but is also allocated to part of the subcarriers (three subcarriers in FIG. 5B) of the third to fourteenth OFDM symbols from the top.

In this way, according to the first mode, the (the CFI value+1)-th OFDM symbol in a subframe is made the starting position, and the PDCCH and the PDSCH are frequency-division-multiplexed in the (the CFI value+1)-th and later OFDM symbols. Consequently, in addition to the OFDM symbols to constitute the above PDCCH region, it is also possible to allocate the PDCCH to part of the subcarrier in the OFDM symbols constituting the PDSCH region, and extend the PDCCH allocation region.

Also, according to the first mode, the user terminal UE detects the (the CFI value+1)-th OFDM symbol as the starting position of a plurality of OFDM symbols where the PDSCH and the PDCCH are frequency-division-multiplexed, and receives the PDCCH that is frequency-division-multiplexed over the (the CFI value+1)-th OFDM symbol and later OFDM symbols. Consequently, even when the PDCCH allocation region is extended, the user terminal UE is able to receive the PDCCH based on the CFI value reported from the radio base station eNB, thereby performing a blind decoding process and so on.

Also, according to the first mode, the user terminal UE is able to detect the starting position of a plurality of OFDM symbols where the PDSCH and the PDCCH are frequency-division-multiplexed, using the CFI value included in the PHICH, so that it is possible to reduce the load of implementation when the PDCCH allocation region is extended.

<Second Mode>

According to a second mode, a user terminal UE receives identification information (for example, PHICH duration, which will be described later), which identifies whether or not the number of OFDM symbols where a delivery acknowledgement channel (PHICH: Physical Hybrid-ARQ Indicator Channel) is multiplexed has been extended, and, based on the received identification information, detects the starting position of the OFDM symbols (multiplexing symbols) where the above PDCCH and PDSCH are frequency-division-multiplexed.

FIG. 6 is a diagram to explain an extended PHICH. The PHICH transmits delivery acknowledgement information (ACK/NACK) of an uplink shared channel (PUSCH: Physical Uplink Shared Channel). As shown in FIG. 6A, when ACK/NACK for a plurality of user terminal UEs are transmitted in the same subframe, a spreading process (spreading) is executed for a plurality of PHICHs, and these plurality of PHICHs are code-division-multiplexed. PHICH groups formed with the plurality of PHICHs that are code-division-multiplexed are furthermore frequency-division-multiplexed. A predetermined number (two, in FIG. 6A) of PHICH groups that are frequency-division-multiplexed are repeated three-fold for quality improvement in cell-edge user terminal UEs.

As shown in FIG. 6A, two PHICH groups that are repeated three-fold are, usually, distributed into three frequency regions and arranged, in the top OFDM symbol in the PDCCH region of subframes. On the other hand, as shown in FIG. 6B, in the extended PHICH, two PHICH groups that are repeated three-fold are distributed and arranged in the first to third varying OFDM symbols from the top of the PDCCH region. Whether or not to apply this extended PHICH may be changed depending on the propagation environment, and when, for example, the propagation environment becomes poorer than predetermined conditions, an extended PHICH may be applied.

Whether or not this extended PHICH is applied is reported from a radio base station eNB to a user terminal UE by higher layer signaling. Whether or not an extended PHICH is applied is indicated by, for example, "PHICH duration" that is reported by the broadcast channel (BCH: Broadcast Channel). The "PHICH duration" is one-bit information, and, when its value is set to "0," this means that an extended PHICH is not applied, that is, the PHICH is allocated only to the top OFDM symbol. On the other hand, when the value is set to "1," this means that an extended PHICH is applied, that is, the PHICH is allocated to the first to third OFDM symbols from the top.

As described above, when the extended PHICH is applied, the PHICH is distributed and multiplexed over the top first to third OFDM symbols of each subframe. In this case, the above-described PDCCH region is also formed with the top first to third OFDM symbols of each subframe, and the CFI value is 3. Consequently, the PDSCH region is formed with the fourth to fourteenth OFDM symbols, excluding the top first to third OFDM symbols constituting the PDCCH region.

In this way, when an extended PHICH is applied, the PDSCH region of each subframe starts from the fourth OFDM symbol from the top, on a fixed basis. So, when an extended PHICH is applied, the radio base station eNB makes the fourth OFDM symbol from the top the starting position on a fixed basis, and frequency-division-multiplexes the PDCCH and the PDSCH in the fourth and later OFDM symbols. Also, the radio base station eNB reports the "PHICH duration," in which a value (for example, "1") to indicate that an extended PHICH is applied is set, to the user terminal UE, via a broadcast channel (BCH).

When the user terminal UE is reported from the radio base station eNB that an extended PHICH is applied (for example, when "PHICH duration" set to "1" is received), the user terminal UE detects the fourth OFDM symbol from the top as the starting position of the OFDM symbols where the PDSCH and the PDCCH are frequency-division-multiplexed, and receives the PDCCH that is frequency-division-multiplexed on the fourth OFDM symbol from the top and later OFDM symbols.

In this way, according to the second mode, when an extended PHICH is applied, the fourth OFDM symbol from the top of a sub frame is made the starting position on a fixed basis, and the PDCCH and the PDSCH are frequency-division-multiplexed in the fourth and later OFDM symbols. Consequently, in addition to the OFDM symbols to constitute the above PDCCH region, it is also possible to allocate the PDCCH to part of the subcarriers in the OFDM symbols to constitute the PDSCH region, so that it is possible to extend the region to allocate the PDCCH.

Also, according to the second mode, the user terminal UE is able to detect whether or not an extended PHICH is applied, based on the value of the "PHICH duration" that is broadcast by a broadcast channel (BCH). Also, when detecting that an extended PHICH is applied, the user terminal UE is able to detect the fourth OFDM symbol from the top as the starting position of the OFDM symbols where the PDSCH and the PDCCH are frequency-division-multiplexed. Consequently, even when the region to allocate the PDCCH is extended, based on the value of the "PHICH duration" that is broadcast by a broadcast channel (BCH), the user terminal UE is able to receive the PDCCH that is allocated to the extended region, and perform a blind decoding process and so on.

Also, according to the second mode, the user terminal is able to detect the starting position of a plurality of OFDM symbols where the PDCCH and the PDSCH are frequency-division-multiplexed, based on whether or not an extended PHICH is applied, so that it is possible to reduce the load of implementation when the PDCCH allocation region is extended.

<Third Mode>

According to a third mode, a user terminal UE receives the allocation starting position of a PDSCH for a different component carrier that is allocated by cross-carrier scheduling, and, based on the received allocation starting position, detects the starting positions of the OFDM symbols (multiplexing symbols) where the PDCCH and the PDSCH are frequency-division-multiplexed.

Figure 7A:
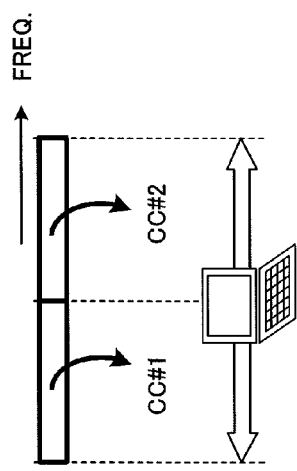
FIG. 7 provides diagrams to explain cross-carrier scheduling.
Figure 7B:
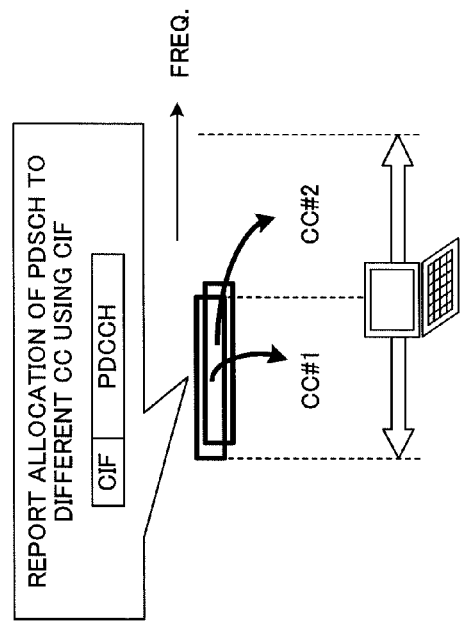

FIG. 7 is a diagram to explain cross-carrier scheduling. LTE-A realizes broadbandization while maintaining backward compatibility with LTE, by, for example, grouping a plurality of (for example, maximum five) 20-MHz fundamental frequency blocks (component carriers: CCs). As shown in FIG. 7A and FIG. 7B, when downlink communication is executed by grouping two component carriers CC #1 and CC #2, a PDSCH is allocated to a user terminal UE in both component carriers CC #1 and CC #2.

In the case shown in FIG. 7A, information about the allocation of the PDSCHs of component carriers CC #1 and CC #2 is transmitted to the user terminal UE using the PDCCHs of component carriers CC #1 and CC #2, respectively. On the other hand, in the case shown in FIG. 7B, information about the allocation of the PDSCHs of component carriers CC #1 and CC #2 is transmitted to the user terminal UE using the PDCCH of one component carrier CC #1. In this way, transmitting information about allocation of PDSCHs in a plurality of component carriers CC #1 and CC #2 in the PDCCH of one component carrier CC #1 is referred to as cross-carrier scheduling.

In the cross-carrier scheduling shown in FIG. 7B, it is necessary to identify which component carrier's PDSCH given allocation information relates to. Consequently, identification information to identify the component carrier is attached to PDSCH allocation information transmitted in the PDCCH. This component carrier identification information is referred to as "CIF" (Carrier Indicator Field).

Figure 8:
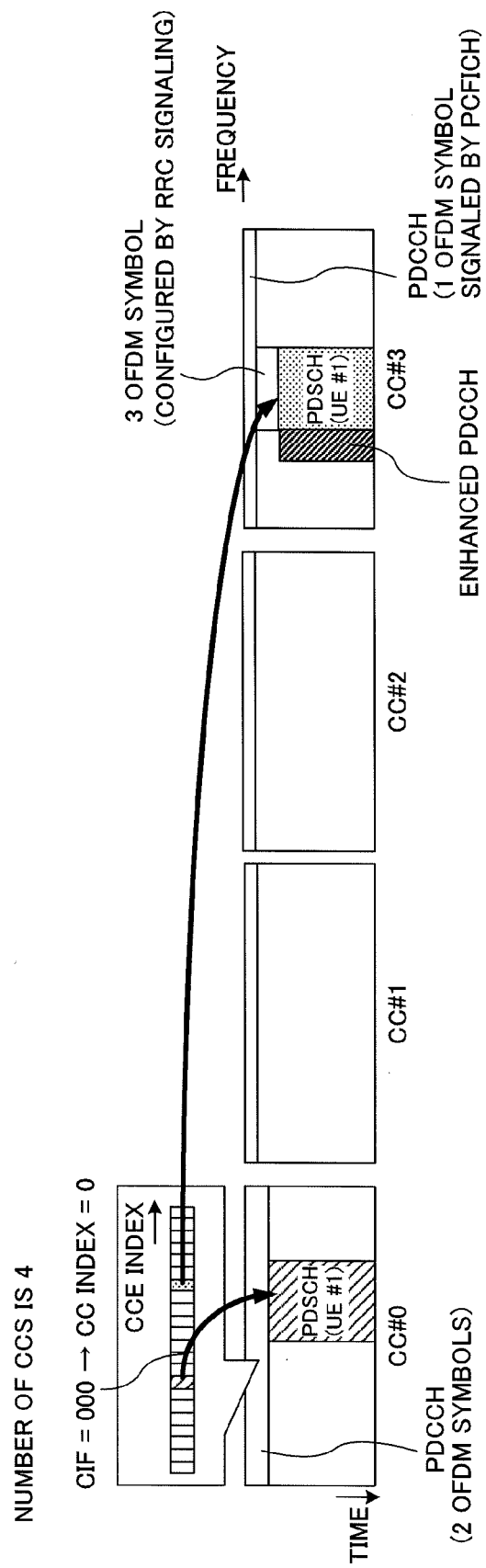
FIG. 8 is a diagram to show an example of extension of a PDCCH allocation region according to a third mode of the present invention.

FIG. 8 is a diagram to show an example of extension of a PDCCH allocation region when cross-carrier scheduling is applied. In FIG. 8, four component carriers CC #0 to CC #3 are grouped, and the PDSCH for user terminal UE #1 is allocated in component carriers CC #0 and CC #3.

As shown in FIG. 8, in cross-carrier scheduling, allocation information of the PDSCH in component carrier CC #3 is transmitted using the PDCCH of different component carrier CC #0. Component carrier CC #3, the PDSCH allocation information of which is transmitted in different component carrier CC #0, is referred to as a "cross-carrier component carrier" (hereinafter referred to as "cross-carrier CC").

The allocation starting position of the PDSCH for the user terminal UE in the cross-carrier CC (component carrier CC #3 in FIG. 8) is reported from the radio base station eNB to the user terminal UE by higher layer signaling. For example, the PDSCH allocation starting position is indicated by "pdsch-Start," which is reported by RRC signaling. "pdsch-Start" indicates the starting position of the OFDM symbols allocated to the user terminal UE in the cross-carrier CC.

For example, in the cross-carrier CC (component carrier CC #3) of FIG. 8, the PDSCH allocation starting position is the third OFDM symbol from the top. Consequently, "pdsch-Start," in which the value is set to 3, is reported by RRC signaling.

In this way, in subframes of a cross-carrier CC, the allocation starting position of the PDSCH for a user terminal UE subjected to cross-carrier scheduling is reported to the user terminal UE by higher layer signaling. So, as shown in FIG. 8, in the cross-carrier CC, the radio base station eNB frequency-division-multiplexes the PDCCH and the PDSCH in the OFDM symbols at and after the PDSCH allocation starting position reported by higher layer signaling.

When the allocation starting position of the PDSCH for the user terminal UE in the cross-carrier CC is reported by higher layer signaling, the user terminal UE detects the reported allocation starting position as the starting position of the OFDM symbols where the PDSCH and the PDCCH are frequency-division-multiplexed. The user terminal UE receives the PDCCH that is frequency-division-multiplexed over the OFDM symbols at and after the detected starting position.

In this way, according to the third mode, when cross-carrier scheduling is applied, in subframes of a cross-carrier CC, the starting position of the PDSCH for a user terminal UE subject to cross-carrier scheduling is used as the starting position of the OFDM symbols where the PDCCH and the PDSCH are frequency-division-multiplexed. By this means, it is not necessary to report the starting position of the PDCCH that is frequency-division-multiplexed with the PDSCH of the cross-carrier CC. At least one of the above first to third modes may be combined and used.

Embodiment

Figure 9:
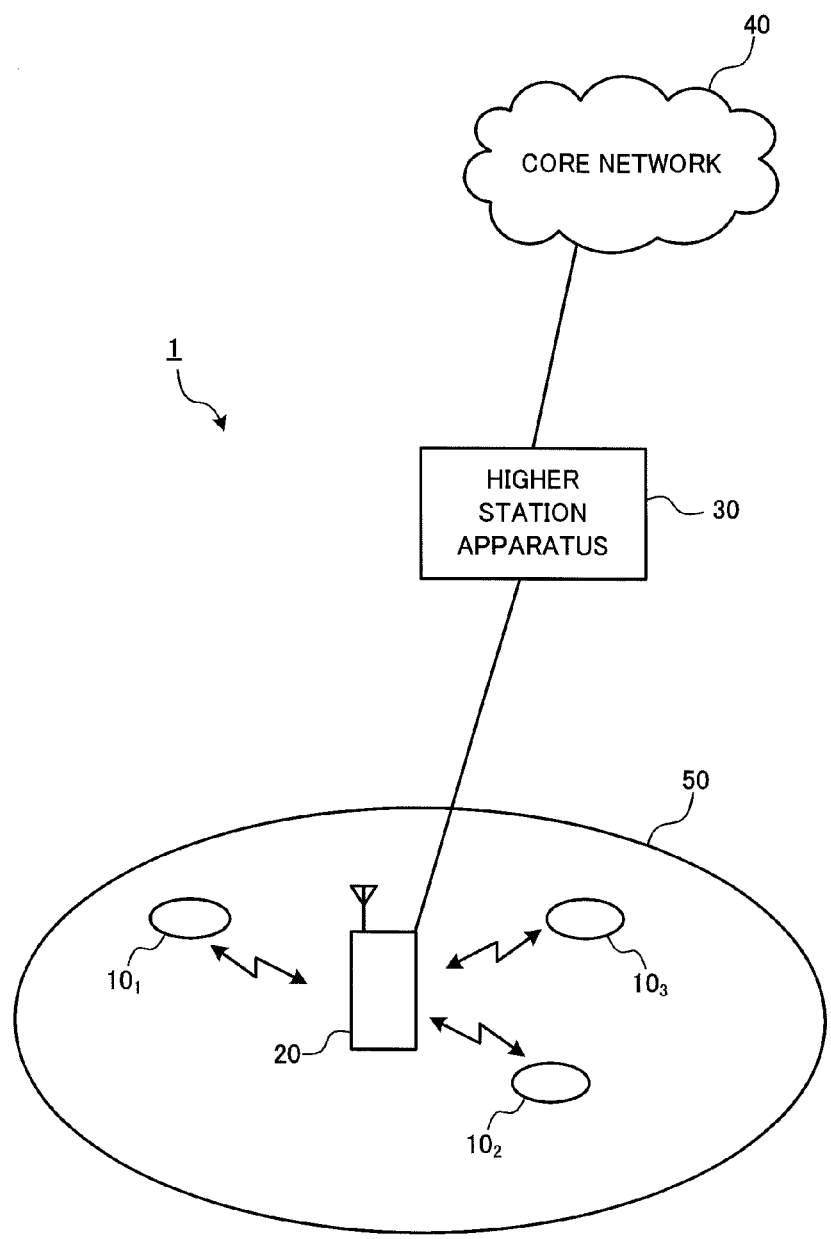
FIG. 9 is a schematic configuration diagram of a mobile communication system according an embodiment of the present invention.

Now, an embodiment of the present invention will be described below in detail with reference to the accompanying drawings. FIG. 9 is a diagram to explain a system configuration of a radio communication system according to the present embodiment. Note that the mobile communication system shown in FIG. 9 is a system to accommodate, for example, LTE, LTE-A, or its successor system. This mobile communication system uses carrier aggregation, which makes a plurality of fundamental frequency blocks, in which the system band of the LTE system is one unit, as one. Also, in this mobile communication system, MU-MIMO transmission is performed. This mobile communication system is furthermore applicable to a Hetnet, in which a micro radio base station is provided in the cell of a radio base station, and relay. In the HetNet, CoMP may be executed as well.

As shown in FIG. 9, a mobile communication system 1 is configured to include a radio base station 20 and a plurality of user terminals 10 ($10_1$, $10_2$, $10_3$, . . . $10_n$, where n is an integer to satisfy n>0) that communicate with this radio base station 20. The radio base station 20 is connected with an higher station apparatus 30, and this higher station apparatus 30 is connected with a core network 40. The user terminals 10 are able to communicate with the radio base station 20 in a cell 50.

Note that the higher station apparatus 30 includes, for example, an access gateway apparatus, a radio network controller (RNC), a mobility management entity (MME) and so on, but is by no means limited to these. The higher station apparatus 30 may be included in the core network 40 as well.

The user terminals ($10_1$, $10_2$, $10_3$, . . . $10_n$) are LTE terminals unless specified otherwise, but may also include LTE-A terminals as well.

As for radio access schemes in the mobile communication system 1, OFDMA (Orthogonal Frequency Division Multiple Access) is applied to the downlink. Meanwhile, on the uplink, SC-FDMA (Single-Carrier-Frequency-Division Multiple Access) and clustered DFT-spreading OFDM are applied.

OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands. Clustered DFT-spreading OFDM is a scheme to realize uplink multiple access by allocating groups of discontinuous, clustered subcarriers (clusters) to one user terminal UE and applying discrete Fourier transform spreading OFDM to each cluster.

Here, communication channel configurations defined in LTE-A will be described. On the downlink, a PDSCH, which is used by each user terminal 10 on a shared basis, and downlink L1/L2 control channels (PDCCH, PCFICH, PHICH) are used. By means of the PDSCH, user data (including higher layer control signals), that is, normal data signals, is transmitted. Transmission data is included in this user data. Note that the fundamental frequency blocks (CCs) and scheduling information allocated to the user terminal 10 in the radio base station 20 are reported to the user terminal 10 by a downlink control channel.

Higher control signals include RRC signaling, which reports an increase/decrease of the number of carrier aggregations and the uplink radio access scheme (SC-FDMA/clustered DFT-spreading OFDM) to be applied to each component carrier, to the user terminal 10. Also, when the search space starting position is controlled in the user terminal 10 based on information reported from the radio base station 20, a configuration to report information (for example, constant K) related to the control algorithm to determine the search space starting position to the user terminal 10 by RRC signaling may be used as well. Then, it is equally possible to provide a configuration to report the fundamental frequency block-specific offset value $n_{CC}$ at the same time by RRC signaling.

On the uplink, a PUSCH, which is used by each user terminal 10 on a shared basis, and a PUCCH, which is an uplink control channel, are used. User data is transmitted by means of this PUSCH. Downlink CSI (CQI/PMI/RI), ACK/NACK and so on are transmitted by the PUCCH. Also, intra-subframe frequency hopping is adopted in SC-FDMA.

Figure 10:
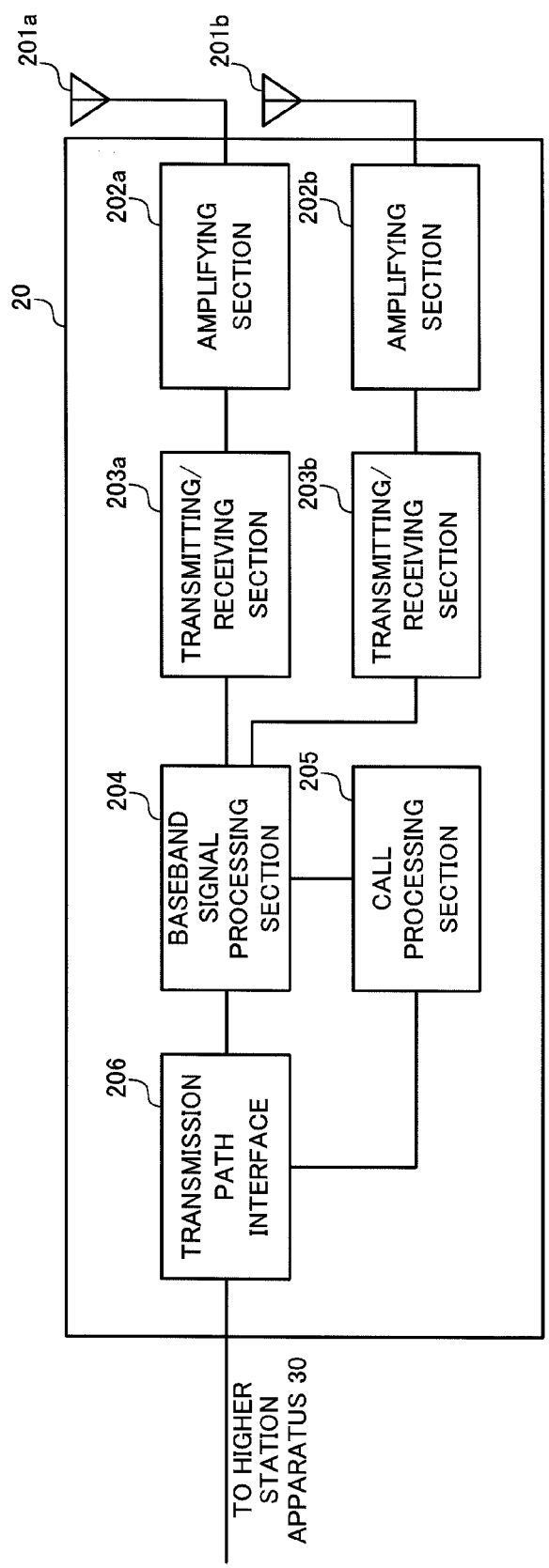
FIG. 10 is a schematic configuration diagram of a radio base station according an embodiment of the present invention.

FIG. 10 is a schematic configuration diagram of a radio base station 20 according to the present embodiment. The radio base station 20 has transmitting/receiving antennas 201a and 201b, amplifying sections 202a and 202b, transmitting/receiving sections 203a and 203b, a baseband signal processing section 204, a call processing section 205, and a transmission path interface 206.

User data to be transmitted from the radio base station 20 to a user terminal 10 on the downlink is input from the higher station apparatus 30, into the baseband signal processing section 204, via the transmission path interface 206.

The baseband signal processing section 204 performs PDCP layer processes such as assigning sequence numbers, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process.

The baseband signal processing section 204 furthermore reports control information for radio communication in the cell 50, to the user terminal 10, by a broadcast channel. The broadcast information for communication in the cell 50 includes, for example, the system bandwidth on the uplink and the downlink, identification information of a root sequence (root sequence index) for generating signals of random access preambles of the PRACH, and so on.

In the transmitting/receiving sections 203a and 203b, baseband signals that are output from the baseband signal processing section 204 are subjected to frequency conversion into a radio frequency band. The RF signals are amplified in the amplifying sections 202a and 202b and output to the transmitting/receiving antennas 201a and 201b.

The radio base station 20 receives the transmission waves transmitted from the user terminal 10 in the transmitting/receiving antennas 201a and 201b. The radio frequency signals received in the transmitting/receiving antennas 201a and 201b are amplified in the amplifying sections 202a and 202b, subjected to frequency conversion into baseband signals in the transmitting/receiving sections 203a and 203b, and output to the baseband signal processing section 204.

The baseband signal processing section 204 performs an FFT process, an IDFT process, error correction decoding, a MAC retransmission control receiving process, and RLC layer and PDCP layer receiving processes. The decoded signal is transferred to the higher station apparatus 30 through the transmission path interface 206.

The call processing section 205 performs call processing such as setting up and releasing communication channels, manages the state of the radio base station 20 and manages the radio resources.

Figure 11:
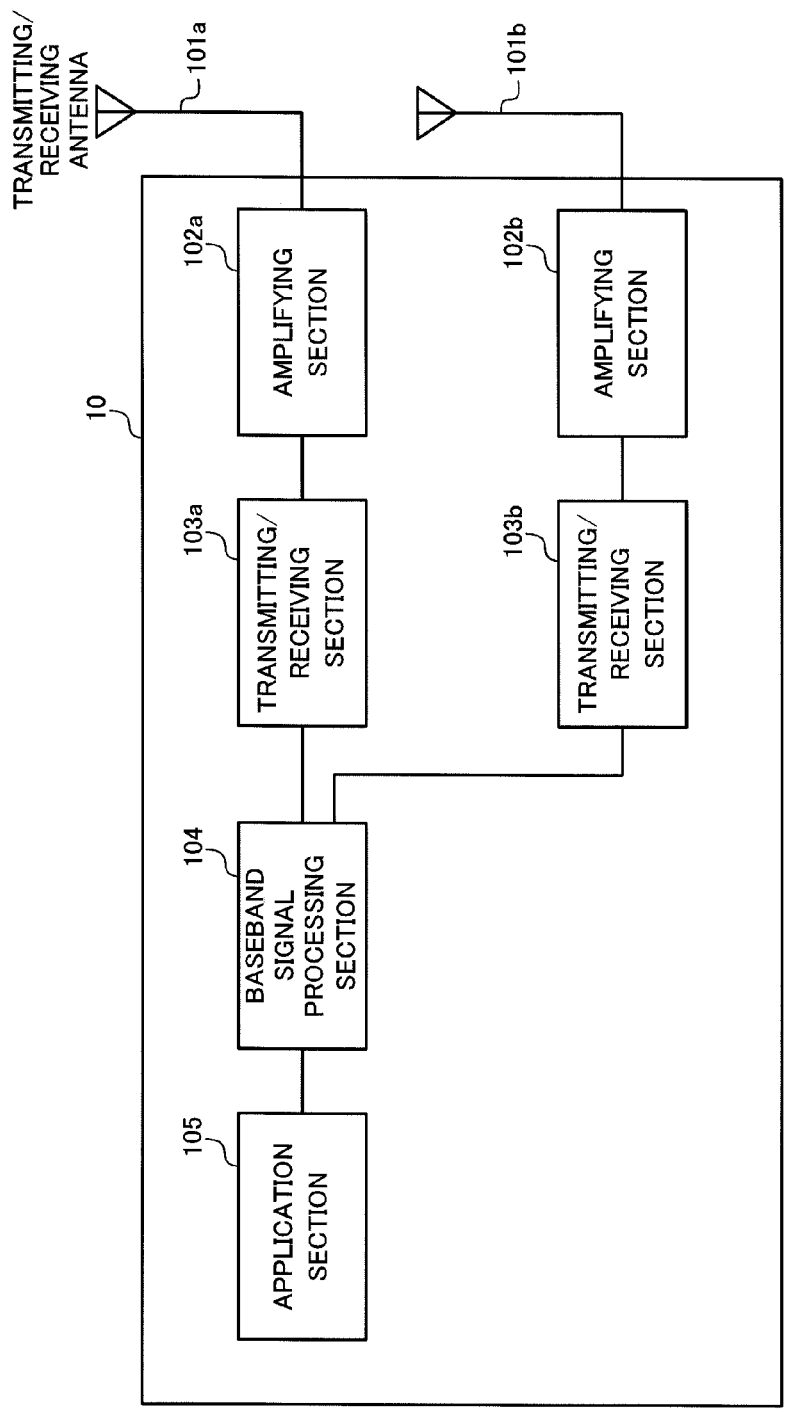
FIG. 11 is a schematic configuration diagram of a user terminal according to an embodiment of the present invention.

FIG. 11 is a schematic configuration diagram of the user terminal 10 according to the present embodiment. The user terminal 10 has a plurality of transmitting/receiving antennas 101a and 101b, amplifying sections 102a and 102b, transmitting/receiving sections 103a and 103b, a baseband signal processing section 104, and an application section 105.

Radio frequency signals received in the transmitting/receiving antennas 101a and 101b are amplified in the amplifying sections 102a and 102b, and converted into baseband signals by the transmitting/receiving sections 103a and 103b by frequency conversion. The baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 into the baseband signal processing section 104. The baseband signal processing section 104 performs a retransmission control (HARQ) transmission process, channel coding, a DFT process, and an IFFT process. The baseband signals that are output from the baseband signal processing section 104 are converted into a radio frequency band in the transmitting/receiving section 103, and, after this, amplified in the amplifying sections 102a and 102b and transmitted from the transmitting/receiving antennas 101a and 101b.

Figure 12:
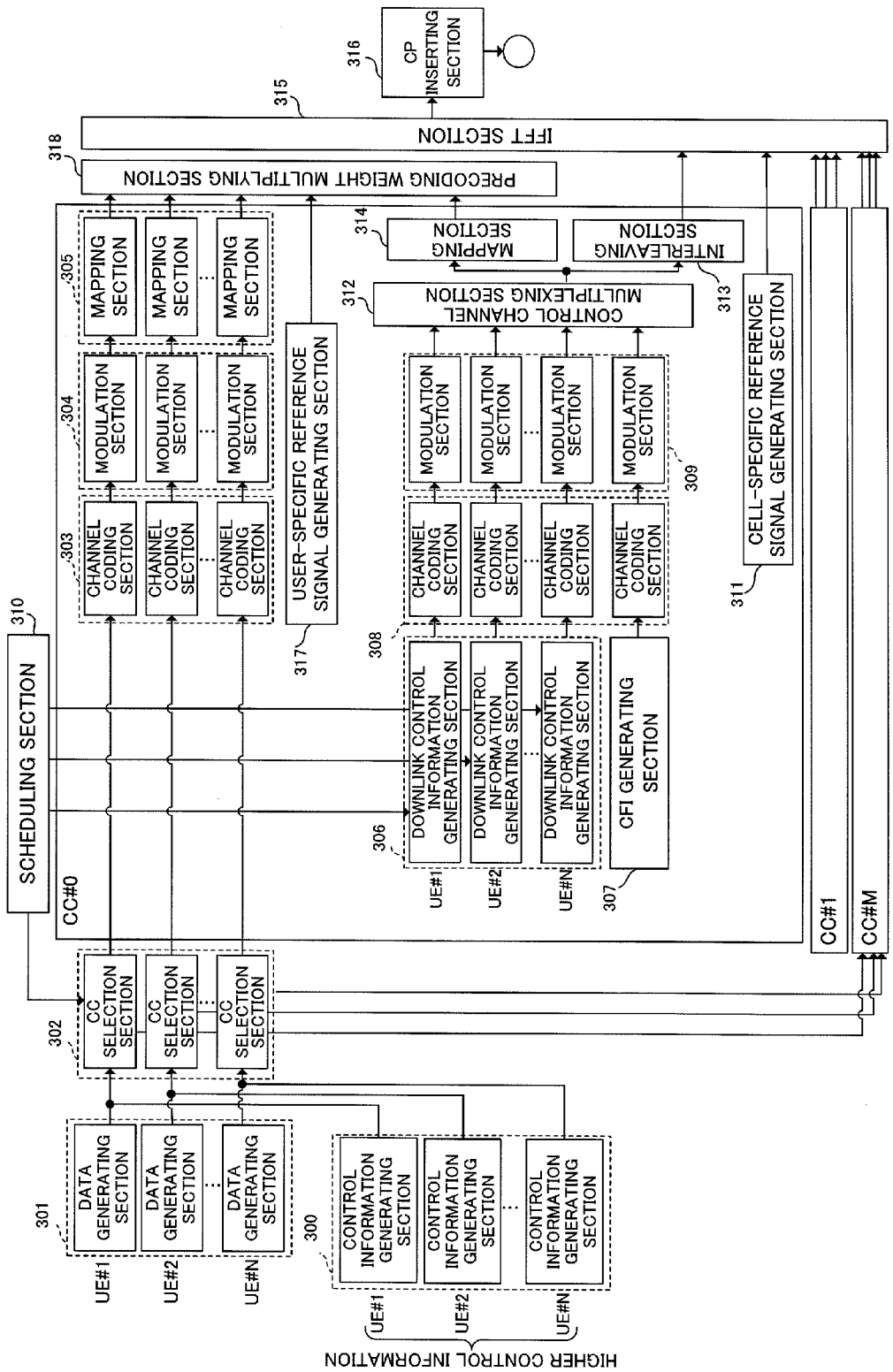
FIG. 12 is a detailed functional configuration diagram of a radio base station according to an embodiment of the present invention.

FIG. 12 is a functional block diagram of a baseband signal processing section 204 provided in the radio base station 20 according to the present embodiment and part of higher layers, and the baseband signal processing section 204 primarily illustrates the function blocks of the transmission processing section. FIG. 12 shows an example of a base station configuration which can support the number of M+1 component carriers (CC #0 to CC #M). Transmission data for the user terminal 10 under the radio base station 20 is transferred from the higher station apparatus 30 to the radio base station 20. Note that although FIG. 12 primarily shows a functional configuration for downlink communication, the radio base station 20 may also have a functional configuration for uplink communication.

The control information generating section 300 generates higher control signals to be transmitted and received by higher layer signaling (for example, RRC signaling). The higher control signals include the starting position (for example, "PDSCH Starting Position" and "pdsch-Start") of a downlink shared channel that is allocated to a different component carrier by cross-carrier scheduling. Also, the higher control signals include identification information (for example, "PHICH duration") which identifies whether or not an extended PHICH is applied.

The data generating section 301 outputs transmission data transferred from the higher station apparatus 30 as user data separately. The component carrier selection section 302 selects component carriers to be allocated to radio communication with the user terminal 10, on a per user basis. In accordance with the component carrier allocation information that is set in the component carrier selection section 302 on a per user basis, higher control signals and transmission data are allocated to the channel coding sections 303 of the applicable component carriers.

The scheduling section 310 controls the resource allocation for each component carrier. Also, the scheduling section 310 receives as input transmission data and retransmission commands from the higher station apparatus 30, and also receives as input channel estimation values and resource block CQIs from the receiving section having measured an uplink received signal.

Also, the scheduling section 310 schedules downlink control information for each user terminal 10 with reference to the retransmission commands, channel estimation values and CQIs that are received as input from the higher station apparatus 30. A propagation path in mobile communication varies differently per frequency, due to frequency selective fading. So, upon transmission of data, resource blocks of good communication quality are allocated to the user terminal 10, on a per subframe basis (which is referred to as "adaptive frequency scheduling"). In adaptive frequency scheduling, a user terminal 10 of good propagation path quality is selected and allocated to each resource block. Consequently, the scheduling section 310 allocates resource blocks, with which improvement of throughput is anticipated, using the CQI of each resource block, fed back from each user terminal 10.

Also, the scheduling section 310 determines whether to transmit downlink control information in the above PDCCH region or frequency-division-multiplex and transmit the downlink control information with the PDSCH in the above PDSCH region. Also, the scheduling section 310 designates resource blocks (mapping positions) of good communication quality on a per subframe basis, by adaptive frequency scheduling, with respect to the downlink control information to be transmitted in the PDSCH region. Consequently, the scheduling section 310 designates the resource blocks (mapping positions) using the CQI of each resource block fed back from each user terminal 10.

Also, the scheduling section 310 controls the number of CCE aggregations in accordance with the conditions of the propagation path with the user terminal 10. The number of CCE aggregations is increased with respect to cell edge users. Also, the MCS (coding rate and modulation scheme) that fulfills a required block error rate with the allocated resource blocks is determined. Parameters to fulfill the MCS (coding rate and modulation scheme) determined in the scheduling section 310 are set in the channel coding sections 303 and 308 and modulation sections 304 and 309.

The baseband signal processing section 204 has channel coding sections 303, modulation sections 304, and mapping sections 305 to match the maximum number of users to multiplex, N, in one component carrier. The channel coding sections 303 perform channel coding of user data that is output from the data generating section 301 (including part of higher control signals) on a per user basis. The modulation sections 304 modulate the user data having been subjected to channel coding, on a per user basis. The mapping sections 305 map the modulated user data to the radio resources of the PDSCH region.

Also, the baseband signal processing section 204 has downlink control information generating sections 306 that generate downlink control information. The downlink control information generating sections 306 generate downlink control information to be transmitted by the PDCCH, per user terminal 10. The downlink control information includes PDSCH allocation information (DL grant), PUSCH allocation information (UL grant) and so on. The PUSCH allocation information (UL grant) is generated using, for example, DCI formats such as DCI format 0/4, and the PDSCH allocation information (DL grant) is generated using, for example, DCI formats such as DCI format 1A. When cross-carrier scheduling is performed, an identification field (CIF) to identify a cross-carrier CC is attached to each DCI format.

Also, the baseband signal processing section 204 has a CFI generating section 307 that generates CFIs. As described above, the CFI indicates the number of OFDM symbols to constitute the PDCCH region of each subframe. The CFI value is changed between 1 and 3, based on the downlink signal received quality in the user terminal 10, and so on.

Also, the baseband signal processing section 204 has channel coding sections 308 and modulation sections 309 to match the maximum number of users to multiplex, N, in one component carrier. The channel coding sections 308 perform channel coding of the downlink control information generated in the downlink control information generating sections 306, per user terminal 10, and also perform channel coding of the CFIs generated in the CFI generating section 307. The modulation section 309 modulates the downlink control information and CFIs after channel coding.

The cell-specific reference signal generating section 311 generates cell-specific reference signals (CRSs: Cell-specific Reference Signals). The cell-specific reference signals (CRSs) are output to an IFFT section 315, which will be described later, and multiplexed over the radio resources of the above PDCCH region and transmitted. Also, the user-specific reference signal generating section 317 generates user-specific downlink demodulation reference signals (DM-RSs: Downlink Modulation-Reference Signals). The user-specific downlink demodulation reference signals (DM-RSs) are output to a precoding weight multiplying section 318, which will be described later, and multiplexed over the radio resources of the above PDSCH region and transmitted.

The downlink control information that is modulated on a per user basis in the modulation sections 309 is multiplexed in the control channel multiplexing section 312. The downlink control information that is transmitted in the PDCCH region is output to an interleaving section 313 and interleaved in the interleaving section 313. Meanwhile, the downlink control information that is frequency-division-multiplexed with user data in the PDSCH region and transmitted is output to the mapping section 314. The mapping section 314 maps the modulated user data to the radio resources of the PDSCH region.

The downlink control information that is output from the mapping section 314 and the user data that is output from the mapping section 305 are input in a precoding weight multiplying section 318. Also, the user-specific downlink demodulation reference signals (DM-RSs) generated in the user-specific reference signal generating section 317 are input in the precoding weight multiplying section 318. The precoding weight multiplying section 318 controls (shifts) the phase and/or amplitude of the transmission signals mapped to subcarriers, for each of a plurality of antennas, based on the user-specific downlink demodulation reference signals (DM-RSs). The transmission signals, to which a phase and/or amplitude shift is applied in the precoding weight multiplying section 318, are output to the IFFT section 315.

Also, the downlink control information that is output from the interleaving section 313 is input in the IFFT section 315. Also, the cell-specific reference signals (CRSs) generated in the cell-specific reference signal generating section 311 are input in the IFFT section 315. The IFFT section 315 performs an inverse fast Fourier transform of the input signals and converts the frequency domain signals into time sequence signals. A cyclic prefix inserting section 316 inserts cyclic prefixes in the time sequence signals of downlink channel signals. Note that a cyclic prefix functions as a guard interval for cancelling the differences in multipath propagation delay. The transmission data to which cyclic prefixes have been added, is transmitted to the transmitting/receiving section 203.

Figure 13:
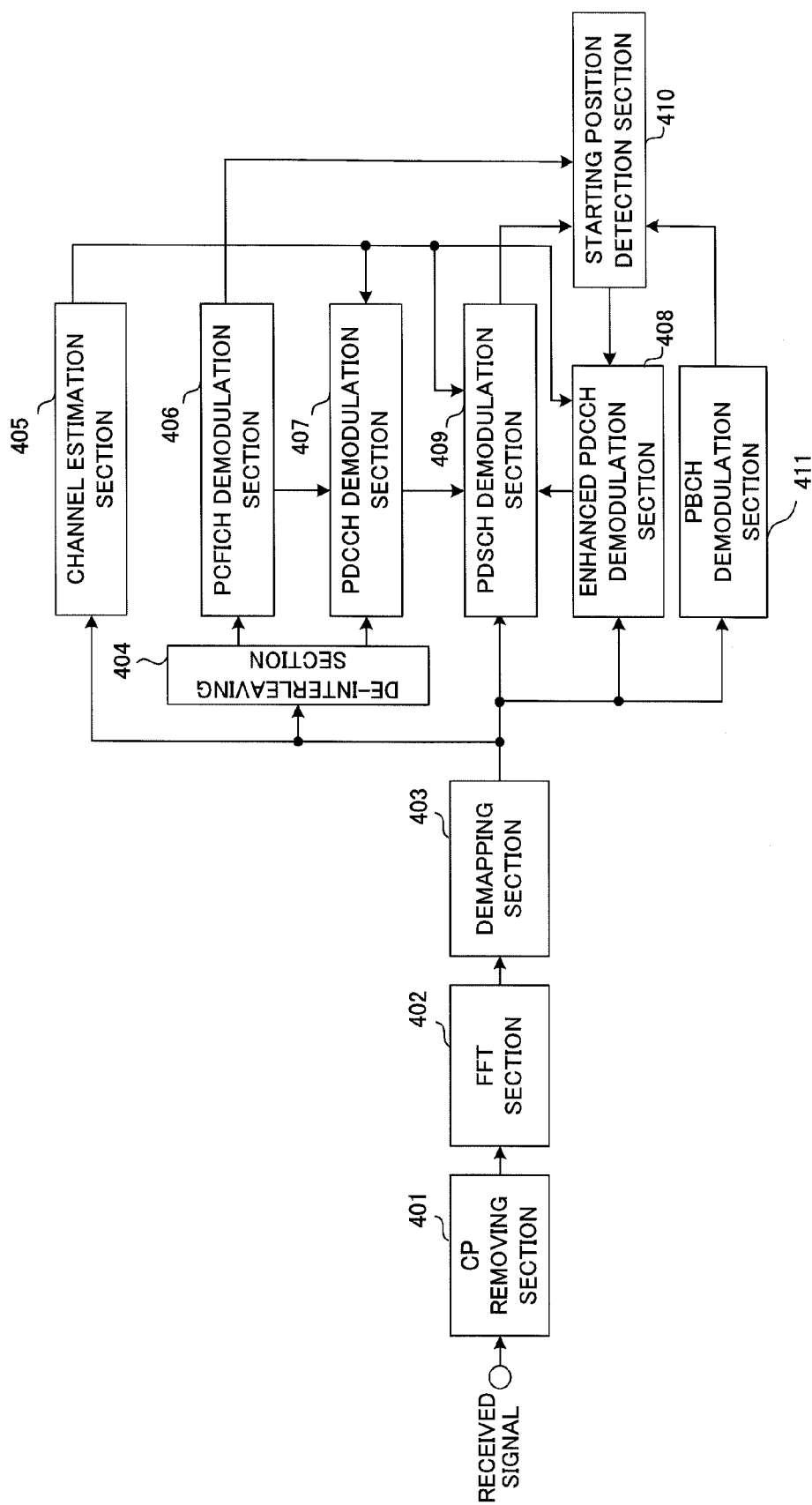
FIG. 13 is a detailed functional configuration diagram of a user terminal according to an embodiment of the present invention.

FIG. 13 is a functional block diagram of a baseband signal processing section 104 provided in the user terminal 10. Note that the user terminal 10 is configured to be capable of executing radio communication using a plurality of serving cells of varying component carriers (CCs). Note that, although FIG. 13 primarily shows a functional configuration for downlink communication, the user terminal 10 may also have a functional configuration for uplink communication.

A downlink signal that is received from the radio base station 20 as received data has the CPs removed in the CP removing section 401. The downlink signal, from which the CPs have been removed, is input in an FFT section 402. The FFT section 402 converts the downlink signal from a time domain signal into a frequency domain signal by performing a fast Fourier transform (FFT) and inputs the result in a demapping section 403. The demapping section 403 demaps the downlink signal, and extracts the downlink control information (PCFICH and PDCCH) transmitted in the PDCCH region, and the user data (PDSCH) and downlink control information (enhanced PDCCH) transmitted in the PDSCH region. The downlink control information (PCFICH and PDCCH) extracted in the demapping section 403 is de-interleaved in a de-interleaving section 404.

Also, the baseband signal processing section 104 has a channel estimation section 405, a PCFICH demodulation section 406 that demodulates the PCFICH, a PDCCH demodulation section 407 that demodulates the PDCCH, an enhanced PDCCH demodulation section 408 that demodulates the PDCCH transmitted in the PDSCH region, a PDSCH demodulation section 409 that demodulates the PDSCH, a starting position detection section 410, and a PBCH demodulation section 411.

The channel estimation section 405 performs channel estimation using cell-specific reference signals (CRS) or user-specific downlink demodulation reference signals (DM-RS). To be more specific, the channel estimation section 405 performs channel estimation in the PDCCH region using the cell-specific reference signals (CRSs) multiplexed over the PDCCH region, and outputs the estimation result to the PDCCH demodulation section 407. On the other hand, the channel estimation section 405 performs channel estimation in the PDSCH region using the downlink demodulation reference signals (DM-RSs) multiplexed over the PDSCH region, and outputs the estimation result to the PDSCH demodulation section 409 and the enhanced PDCCH demodulation section 408.

The PCFICH demodulation section 406 demodulates the PCFICH multiplexed over the top OFDM symbol of each subframe, and acquires the CFIs, which indicate the number of OFDM symbols to constitute the PDCCH region. The PCFICH demodulation section 406 outputs the acquired CFIs to the PDCCH demodulation section 407 and the starting position detection section 410.

The PDCCH demodulation section 407 specifies the PDCCH region of each subframe based on the CFIs output from the PCFICH demodulation section 406, demodulates the PDCCH multiplexed over the PDCCH region, and performs blind decoding. Also, the PDCCH demodulation section 407 acquires the downlink control information for the user terminal UE by blind decoding. As described above, the downlink control information includes PDSCH allocation information (DL grant). The PDCCH demodulation section 407 outputs the PDSCH allocation information (DL grant) to the PDSCH demodulation section 409. Note that the PDCCH demodulation section 407 performs the above demodulation using the channel estimation result of cell-specific reference signals (CRSs) in the channel estimation section 405.

The enhanced PDCCH demodulation section 408 specifies the starting position of the OFDM symbols (multiplexing symbols) where the PDCCH is frequency-division-multiplexed in the PDSCH region, based on the starting position output from the starting position detection section 410, which will be described later. The enhanced PDCCH demodulation section 408 demodulates the PDCCH that is frequency-division-multiplexed over the OFDM symbols at and after the specified starting position and performs blind decoding. Also, the enhanced PDCCH demodulation section 408 acquires the downlink control information for the user terminal UE by blind decoding, and outputs the PDSCH allocation information (DL grant) to the PDSCH demodulation section 409.

Note that the enhanced PDCCH demodulation section 408 performs the above demodulation using the channel estimation result by the downlink demodulation reference signals (DM-RSs) in the channel estimation section 405. The downlink demodulation reference signals (DM-RSs) are user-specific reference signals, so that beam form gain is achieved. Consequently, demodulation using downlink demodulation reference signals (DM-RSs) increases the amount of information that can be transmitted per symbol, compared to demodulation using cell-specific reference signals (CRSs) (see the above PDCCH demodulation section 407), and therefore is effective to increase the capacity.

The PDSCH demodulation section 409 demodulates the PDSCH for the user terminal UE multiplexed over the PDSCH region, based on the PDSCH allocation information output from the PDCCH demodulation section 407 or the enhanced PDCCH demodulation section 408. As described above, the PDSCH includes higher control signals in addition to user data. The demodulated higher control signals are output to the starting position detection section 410. Also, the higher control signals include information to indicate the starting position of a PDSCH allocated to a different component carrier by cross-carrier scheduling (for example, "PDSCH Starting Position" and "pdsch-Start").

The PBCH demodulation section 411 demodulates the broadcast channel (PBCH) including higher control signals. The higher control signals transmitted by the broadcast channel include identification information (for example, "PHICH duration") which identifies whether an extended PHICH is applied.

The starting position detection section 410 detects the starting position of the OFDM symbols where the PDSCH and the PDCCH are frequency-division-multiplexed in the PDSCH region. To be more specific, the starting position detection section 410 detects the starting position based on the CFIs input from the PCFICH demodulation section 406. For example, as has been described with reference to FIG. 5, the starting position detection section 410 detects the (the CFI value+1)-th OFDM symbol from the top of a subframe as the above starting position.

Also, the starting position detection section 410 may also detect, based on the higher control signals input from the PDSCH demodulation section 409 or the PBCH demodulation section 411, the above starting position. To be more specific, as has been described with reference to FIG. 6B, when higher control signals (for example, "PHICH Duration") indicates that an extended PHICH is applied in the PDCCH region, the starting position detection section 410 may detect the fourth OFDM symbol from the top of a subframe as the starting position.

Also, as has been described with reference to FIG. 8, the starting position detection section 410 may detect the starting position of a PDSCH that is allocated to a different component carrier by cross-carrier scheduling represented by higher control signals (for example, "PDSCH Starting Position" and "pdsch-Start"), as a higher starting position.

Next, the operations of a mobile communication system according to the present embodiment will be described. In the mobile communication system according to the present embodiment, a radio base station 20 frequency-division-multiplexes the PDSCH and the PDCCH over radio resources (OFDM symbols) in the resource region for the above downlink shared channel in the PDSCH region.

Here, the radio base station 20 may frequency-division-multiplex the PDSCH and the PDCCH over OFDM symbols at and after the (the CFI value+1)-th OFDM symbol, based on the (the CFI value+1)-th OFDM symbol indicating the number of OFDM symbols to constitute the PDCCH region as the starting position. Also, when an extended PHICH is applied, the radio base station 20 may make the fourth OFDM symbol from the top the starting position and frequency-division-multiplex the PDSCH and the PDCCH over the fourth OFDM symbol from the top and later OFDM symbols. Also, when a PDSCH is allocated to a different component carrier by cross-carrier scheduling, the radio base station 20 may make the PDSCH allocation starting position for the user terminal 10 in that different component carrier (cross-carrier CC) the starting position and frequency-division-multiplex the PDSCH and the PDCCH over the OFDM symbols at and after the starting position.

In the mobile communication system according to the present embodiment, the user terminal 10 detects the starting position of the radio resources (OFDM symbols) where the PDSCH and the PDCCH are frequency-division-multiplexed. Also, the user terminal 10 receives the PDCCH that is frequency-division-multiplexed over the radio resources (OFDM symbol) starting from the detected starting position.

Here, the user terminal 10 may receive a CFI indicating the number of OFDM symbols to constitute the PDCCH region and detect the starting position based on the received CFI. Also, the user terminal 10 may receive identification information (PHICH duration) as to whether or not an extended PHICH is applied, and detect the above starting position based on the identification information (PHICH duration). Also, the user terminal 10 may receive information to represent the allocation starting position of a downlink shared channel that is allocated to a different component carrier by cross-carrier scheduling (for example, "PDSCH Starting Position" and "pdsch-Start") and detect the starting position based on the received information.

Also, the embodiments disclosed herein are only examples in all respects, and are by no means limited to these embodiments. The scope of the present invention is defined not only by the descriptions of the above embodiments and also is set by the claims, and covers all the modifications and alterations within the meaning and range equivalent to the claims.

The disclosure of Japanese Patent Application No. 2011-103178, filed on May 2, 2011, including the specification, drawings and abstract, is incorporated herein by reference in its entirety.

The invention claimed is:

1. A user terminal that receives an enhanced downlink control channel frequency-division-multiplexed with a downlink shared channel from a radio base station, the user terminal comprising:

a receiving section that receives from the radio base station a first or a second value of a Physical Hybrid-ARQ Indicator Channel (PHICH) duration, the first value indicating that an extended PHICH is not applied and the second value indicating that the extended PHICH is applied; and a detection section that detects a starting position of an orthogonal frequency division multiplexing (OFDM) symbol for the enhanced downlink control channel in a subframe, based on the PHICH duration, wherein when the second value is signaled by higher layer signaling, the detection section detects that a control format indicator (CFI) value is equal to a number of OFDM symbols to which the PHICH is multiplexed, and wherein when the first value is received, the PHICH is allocated and multiplexed to only a single OFDM symbol; wherein when the second value is received, the PHICH is allocated and multiplexed to a plurality of OFDM symbols.

2. The user terminal according to claim 1, wherein the receiving section receives the first or the second value of the PHICH duration by a Broadcast Channel (BCH).

3. A radio base station that transmits an enhanced downlink control channel frequency-division-multiplexed with a downlink shared channel, the radio base station comprising:

a transmission section that transmits a first or a second value of a Physical Hybrid-ARQ Indicator Channel (PHICH) duration, the first value indicating that an extended PHICH is not applied and the second value indicating that the extended PHICH is applied; and a mapping section that maps the enhanced downlink control channel to an orthogonal frequency division multiplexing (OFDM) symbol that starts with a starting position based on the PHICH duration, wherein the transmission section transmits the second value by higher layer signaling for a control format indicator (CFI) value that is equal to a number of OFDM symbols to which the PHICH is multiplexed, and wherein when the first value is received, the PHICH is allocated and multiplexed to only a single OFDM symbol; wherein when the second value is received, the PHICH is allocated and multiplexed to a plurality of OFDM symbols.

4. A method of receiving a downlink control channel for a user terminal to receive an enhanced downlink control channel frequency-division-multiplexed with a downlink shared channel from a radio base station, the method comprising:

in the radio base station, transmitting a first or a second value of a Physical Hybrid-ARQ Indicator Channel (PHICH) duration; and in the user terminal, detecting a starting position of an orthogonal frequency division multiplexing (OFDM) symbol for the enhanced downlink control channel in a subframe based on the PHICH duration, wherein when the second value is signaled by higher layer signaling, the user terminal detects that a control format indicator (CFI) value is equal to a number of OFDM symbols to which the PHICH is multiplexed, and wherein when the first value is received, the PHICH is allocated and multiplexed to only a single OFDM symbol; wherein when the second value is received, the PHICH is allocated and multiplexed to a plurality of OFDM symbols.

5. A mobile communication system for a user terminal to receive an enhanced downlink control channel frequencydivision-multiplexed with a downlink shared channel from a radio base station, the mobile communication system comprising:
  the radio base station transmitting a first or a second value of a Physical Hybrid-ARQ Indicator Channel (PHICH) duration; and
  the user terminal detecting a starting position of an orthogonal frequency division multiplexing (OFDM) symbol for the enhanced downlink control channel in a subframe based on the PHICH duration, wherein
  when the second value is signaled by higher layer signaling, the user terminal detects that a control format indicator (CFI) value is equal to a number of OFDM symbols to which the PHICH is multiplexed, and
  wherein when the first value is received, the PHICH is allocated and multiplexed to only a single OFDM symbol; wherein when the second value is received, the PHICH is allocated and multiplexed to a plurality of OFDM symbols.

* * * * *

UNITED STATES PATENT AND TRADEMARK OFFICE
CERTIFICATE OF CORRECTION

PATENT NO. : 9,806,834 B2  Page 1 of 1
APPLICATION NO. : 14/114606
DATED : October 31, 2017
INVENTOR(S) : Nagata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

Signed and Sealed this
Twenty-fifth Day of September, 2018

Andrei Iancu
*Director of the United States Patent and Trademark Office*